US011008148B2

(12) United States Patent
Schlack et al.

(10) Patent No.: US 11,008,148 B2
(45) Date of Patent: May 18, 2021

(54) INFLATABLE CONTAINER FOR TRANSPORTING A BIOPHARMACEUTICAL FLUID AND SYSTEM AND METHOD IMPLEMENTING SUCH A CONTAINER

(71) Applicant: SARTORIUS STEDIM FMT SAS, Aubagne (FR)

(72) Inventors: Stefan Schlack, Göttingen (DE); Jean-Marc Cappia, Gémenos (FR)

(73) Assignee: SARTORIUS STEDIM FMT SAS, Aubagne (FR)

( * ) Notice: Subject to any disclaimer, the term of this patent is extended or adjusted under 35 U.S.C. 154(b) by 0 days.

(21) Appl. No.: 16/060,131

(22) PCT Filed: Dec. 7, 2016

(86) PCT No.: PCT/EP2016/079974
§ 371 (c)(1),
(2) Date: Jun. 7, 2018

(87) PCT Pub. No.: WO2017/097793
PCT Pub. Date: Jun. 15, 2017

(65) Prior Publication Data
US 2018/0354700 A1  Dec. 13, 2018

(30) Foreign Application Priority Data

Dec. 7, 2015 (EP) ..................... 15306951

(51) Int. Cl.
*B65D 81/03* (2006.01)
*A01N 1/02* (2006.01)
(Continued)

(52) U.S. Cl.
CPC ........... *B65D 81/03* (2013.01); *A01N 1/0252* (2013.01); *A01N 1/0273* (2013.01); *A61J 1/1468* (2015.05);
(Continued)

(58) Field of Classification Search
CPC .. B65D 81/03; B01F 7/00341; B01F 3/04531; B01F 3/04106; B01F 15/0085; A61J 1/1468; A01N 1/0252; A01N 1/0273
(Continued)

(56) References Cited

U.S. PATENT DOCUMENTS 2,751,953 A * 6/1956 Grimm .................. F16L 59/08
383/3
3,044,515 A * 7/1962 Eades ................ B65D 88/1606
383/3
(Continued)

FOREIGN PATENT DOCUMENTS

DE  299 13 840 U1  3/2000
EP  0077189 A1 * 4/1983 ................ A61J 1/10
(Continued)

OTHER PUBLICATIONS

International Search Report, dated Mar. 13, 2017, from corresponding PCT/EP2016/079974 application.
(Continued)

*Primary Examiner* — Chun Hoi Cheung
*Assistant Examiner* — Brijesh V. Patel
(74) *Attorney, Agent, or Firm* — Nixon & Vanderhye

(57) ABSTRACT

Disclosed is a container for transporting a biopharmaceutical fluid, the container including a leak-tight wall having an outer portion and an inner portion, the outer portion and the inner portion delimiting between them an intermediate space that may be inflated under pressure with an inflation gas, the container being adapted to be alternately in: a non-inflated state in which the container is empty of pressurized inflation gas; an inflated state in which the wall of the container is inflated and delimits an internal cavity adapted to contain the biopharmaceutical fluid. The wall includes a peripheral lateral wall around the internal cavity, the peripheral lateral
(Continued)

wall being completely rigid or semi-rigid when the container is in the inflated state so as to ensure a protection of the biopharmaceutical fluid.

9 Claims, 3 Drawing Sheets

(51) Int. Cl.
 *B01F 3/04* (2006.01)
 *A61J 1/14* (2006.01)
 *B01F 15/00* (2006.01)
 *B01F 7/00* (2006.01)

(52) U.S. Cl.
 CPC ...... *B01F 3/04106* (2013.01); *B01F 3/04531* (2013.01); *B01F 7/00341* (2013.01); *B01F 15/0085* (2013.01)

(58) Field of Classification Search
 USPC ........ 206/522, 26, 521; 383/3, 109, 119, 19, 383/22; 222/95; 604/141
 See application file for complete search history.

(56) References Cited

U.S. PATENT DOCUMENTS

| | | | | |
|---|---|---|---|---|
| 3,205,106 | A * | 9/1965 | Cross | B29D 22/02 156/79 |
| 3,556,186 | A * | 1/1971 | Besthorne | B65D 31/00 383/3 |
| 3,581,792 | A * | 6/1971 | Weiss | B64D 37/12 206/521 |
| 3,616,126 | A * | 10/1971 | Tungseth | F16F 1/44 428/86 |
| 3,742,994 | A * | 7/1973 | Pensak | B65F 1/02 383/3 |
| 3,838,794 | A * | 10/1974 | Cogley | A61J 1/10 222/95 |
| 4,048,994 | A * | 9/1977 | Lo | A61J 1/10 604/142 |
| 4,462,331 | A * | 7/1984 | McCrory | B63B 7/08 114/345 |
| 4,675,930 | A * | 6/1987 | Sargent | A47G 9/10 5/630 |
| 4,906,502 | A * | 3/1990 | Rudy | A43B 13/20 428/69 |
| 5,152,018 | A * | 10/1992 | Lea | A47C 17/70 5/420 |
| 5,240,135 | A * | 8/1993 | Lepinoy | B65D 88/22 220/23.91 |
| 5,487,470 | A * | 1/1996 | Pharo | B65D 81/052 206/521 |
| 5,552,205 | A * | 9/1996 | Lea | A47C 17/70 428/74 |
| 5,595,806 | A * | 1/1997 | Korfmacher | B65D 81/02 206/521 |
| 5,624,035 | A * | 4/1997 | Kim | B65D 81/052 206/521 |
| 5,720,728 | A * | 2/1998 | Ford | A61M 3/0233 604/131 |
| 5,731,052 | A * | 3/1998 | Gancedo | B32B 7/08 206/524.2 |
| 5,833,053 | A * | 11/1998 | Wood | A45C 11/04 206/5 |
| 5,868,095 | A * | 2/1999 | Zeromski | B63B 7/085 114/345 |
| 5,897,012 | A | 4/1999 | Sortwell | |
| 5,941,866 | A | 8/1999 | Niedospial | |
| 5,988,422 | A | 11/1999 | Vallot | |
| 6,176,613 | B1 * | 1/2001 | Chen | B65D 33/00 206/522 |
| 6,283,296 | B1 * | 9/2001 | Newman | B65D 81/052 206/522 |
| 6,460,837 | B1 * | 10/2002 | Ahern | F16F 7/00 267/148 |
| 6,948,204 | B2 * | 9/2005 | Chae | A47C 27/081 5/709 |
| 2003/0155268 | A1 * | 8/2003 | Wang | A45C 3/001 206/522 |
| 2005/0061409 | A1 * | 3/2005 | Chung | A45C 7/0081 150/110 |
| 2008/0035519 | A1 * | 2/2008 | Swartz | B65D 31/145 206/522 |
| 2009/0266722 | A1 * | 10/2009 | Rogers | B65D 33/25 206/216 |
| 2010/0303387 | A1 | 12/2010 | Dahlquist | |
| 2012/0011642 | A1 * | 1/2012 | Dainese | A41D 13/018 2/455 |
| 2012/0269594 | A1 | 10/2012 | Starnes | |
| 2013/0092706 | A1 | 4/2013 | Ross | |
| 2016/0015599 | A1 | 1/2016 | Gentile | |
| 2017/0217660 | A1 | 8/2017 | Zhang | |

FOREIGN PATENT DOCUMENTS

| | | |
|---|---|---|
| EP | 2 921 739 A1 | 9/2015 |
| FR | 2781202 B1 | 1/2001 |
| WO | 2005/5026019 A1 | 3/2005 |
| WO | 2006/116428 A2 | 11/2006 |
| WO | 2014/140494 A1 | 9/2014 |
| WO | WO-2016145239 A1 * | 9/2016 ........... A45C 7/0081 |

OTHER PUBLICATIONS

Office Action in European Patent Application No. 15 306 951.3 dated Jul. 11, 2019.
Office Action in European Patent Application No. 15 306 951.3 dated May 14, 2020.

* cited by examiner

INFLATABLE CONTAINER FOR TRANSPORTING A BIOPHARMACEUTICAL FLUID AND SYSTEM AND METHOD IMPLEMENTING SUCH A CONTAINER

FIELD OF THE INVENTION

The invention relates to an inflatable container for receiving and transporting a biopharmaceutical fluid. The invention relates also to a system for inflating such a container, and a method for receiving and transporting a biopharmaceutical fluid, in which such a system is implemented. The invention also relates to an inflatable container for storing a biopharmaceutical fluid.

"Biopharmaceutical fluid" should be understood to mean a product derived from biotechnology (culture media, cell cultures, buffer solutions, artificial nutrition liquids, blood products and derivatives of blood products) or a pharmaceutical product or, more generally, a product intended to be used in the medical domain. Such a product is in liquid, paste or possibly powder form. The invention applies also to other products subject to similar requirements with regard to their packaging.

BACKGROUND OF THE INVENTION

It is known practice to use rigid containers, for example made of stainless steel, in order to transport biopharmaceutical fluids. Such containers make it possible in particular to transport biopharmaceutical fluids over great distances, by ship or by aeroplane, from the place where the containers have been filled to the place where the fluids will finally be used. Since these biopharmaceutical fluids are often of high financial value, even often of high value for the health of individuals since they may be used for example to manufacture medicines intended for human health, it is essential that they reach their place of destination safely and without contamination.

However, one drawback with these rigid containers is that they need to be washed and sterilized, for example by autoclaving, before they may be reused in order to avoid any subsequent risk of contamination. Such a cleaning step is particularly costly and lengthy to implement, notably because of the specific features of certain steels, notably of stainless steel, that form the containers, and always presents the risk of leaving traces of contamination.

Also known are containers made of rigid plastic material. However, these containers cannot have a great capacity, notably greater than 500 litres, because of resistance problems, and cannot be washed by autoclaving. Nor may plastic containers be combined with systems for cooling and/or heating the biopharmaceutical fluid. Furthermore, such containers take up a significant space even once emptied of biopharmaceutical fluid. Also, they require a lot of space in order to be stored between two uses.

The document US 2010303387 describes an inflatable, reusable and foldable plastic structure for storage or transportation. A plurality of air chambers forms an exterior frame of the structure, while a flexible coating forms the interior.

However, the flexible coating of such a structure is not rigid enough to effectively protect the content of the container, in particular a biopharmaceutical fluid during transport operations and in order to ensure that the container is kept stable once the latter is filled with the biopharmaceutical fluid.

Consequently, there is, in the specific field of the invention, the need to be able to transport a biopharmaceutical fluid safely, simply and economically, with a high capacity container.

OBJECTS AND SUMMARY

To remedy the abovementioned problem, according to a first aspect, the invention relates to a container for transporting a biopharmaceutical fluid, the container comprising a leak-tight wall having an outer portion and an inner portion, the outer portion and the inner portion delimiting between them an intermediate space that may be inflated under pressure with an inflation gas, the container being adapted to be alternately in:

a non-inflated state in which the container is empty of pressurized inflation gas, an inflated state in which the wall of the container is inflated and delimits an internal cavity adapted to contain the biopharmaceutical fluid, the wall comprising a peripheral lateral wall around the internal cavity, the peripheral lateral wall being completely rigid or semi-rigid when the container is in the inflated state so as to ensure a protection of the biopharmaceutical fluid.

In various embodiments according to the present invention, use may also possibly be made of one and/or the other of the following dispositions, taken separately or in combination, according to which:

the internal cavity is completely surrounded by the wall so as to form a closed and sterile internal cavity;

the wall comprises a top wall that is partially or completely open so as to form an opening emerging in the internal cavity;

the outer portion is partially or completely covered by a non-slip coating;

the inner portion is compatible with and/or neutral to the biopharmaceutical fluid, the biopharmaceutical fluid being directly in contact with the inner portion;

an internal pouch made of plastic material, flexible and leak-tight, is arranged in the internal cavity, the internal pouch being suited and intended to receive the biopharmaceutical fluid;

the internal pouch is reversibly fixed to the inner portion, the internal pouch being an element distinct and separate from the container;

the internal pouch is irreversibly fixed to the inner portion of the container by welding, by gluing or similar;

the wall of the container is at least partly, even totally, transparent or translucent so as to make it possible to view through the biopharmaceutical fluid;

the wall is at least partly, even totally, opaque to light or to ultraviolet rays;

the container comprises at least one injection orifice for inflation gas fluidically connected with the intermediate space, an injection tube being associated with the injection orifice by a leak-tight link and having an injection inlet opposite the injection orifice;

the outer portion and/or the inner portion comprises/comprise a plurality of layers of plastic material stuck together superposed one on top of the other;

the intermediate space comprises a plurality of rigid filaments extending between the outer portion and an inner portion;

the container comprises at least one filling orifice fluidically connected with the internal cavity, a filling tube being associated by a leak-tight link with the filling orifice and having a filling inlet opposite the filling orifice;

the container comprises at least one draining orifice fluidically connected with the internal cavity, a draining tube being associated with the draining orifice having a draining outlet opposite the draining orifice;

the internal cavity of the container has a capacity of between 100 litres and 1000 litres, even between 200 litres and 500 litres;

the container comprises means for heating and/or cooling the biopharmaceutical fluid to be contained by the container;

the intermediate space comprises a chamber adapted to contain a cooling and/or heating liquid making it possible to heat and/or cool the biopharmaceutical fluid;

the container comprises means for mixing and/or means for aerating the biopharmaceutical fluid that are fixed onto the wall of the container;

the container comprises a bottom wall linked to the lateral peripheral wall, the lateral peripheral wall being arranged vertically and transversely to the bottom wall such that the container in the inflated state is in the form of a tank;

the peripheral lateral wall has a height less than 1 metre when the container is in the inflated state;

the container comprises a bottom wall, the bottom wall having a surface area less than one square metre when the container is in the inflated state.

The invention relates also to a system comprising a container according to the invention and an internal pouch made of plastic material, flexible and leak-tight, adapted to be arranged in the internal cavity of the container, the internal pouch being suited and intended to receive the biopharmaceutical fluid.

The invention relates also to a system for inflating a container according to the invention, the system comprising the container and a device for inflating the container, the device comprising a source of pressurized inflation gas and an injection line for pressurized inflation gas, suitable for being associated by fluidic connection at the outlet with an injection orifice of the container.

The invention relates also to a method for receiving and transporting biopharmaceutical fluid, in which:

a system according to the invention for inflating a container is provided, the container being initially in the non-inflated state;

the intermediate space of the wall of the container is inflated with the device;

the internal cavity of the container is filled with the biopharmaceutical fluid at a place of filling, notably via a filling inlet;

the container is transported from the place of filling to a place of use of the biopharmaceutical fluid;

at the place of use, the container is emptied of the biopharmaceutical fluid via a draining outlet;

the container is disposed of, the container being disposable.

According to one embodiment, an internal pouch is introduced into the internal cavity of the container prior to the step of filling of the internal cavity with the biopharmaceutical fluid, so as to fill the internal pouch with the biopharmaceutical fluid.

BRIEF DESCRIPTION OF THE DRAWINGS

A number of embodiments of the invention will now be described with the help of the drawings, in which.

MORE DETAILED DESCRIPTION

Figure 1A:
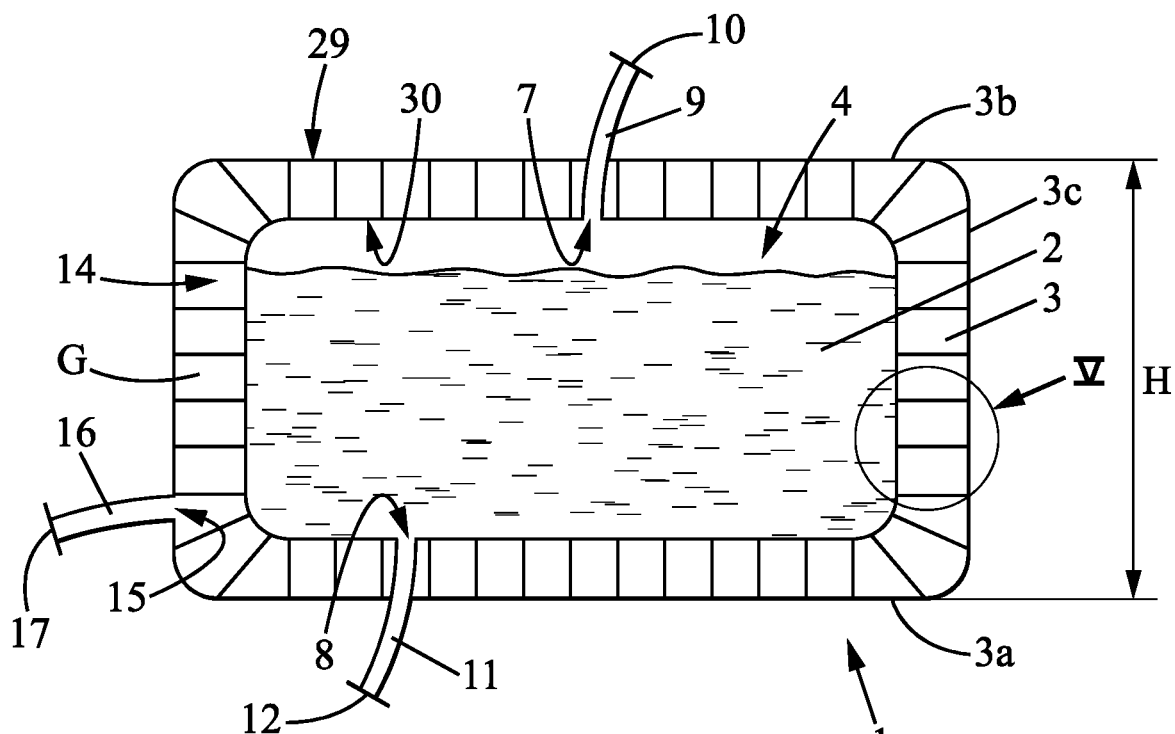
FIG. 1A is a schematic view of a container in the inflated state according to a first exemplary embodiment, the internal cavity of the container containing a biopharmaceutical fluid.

Below is a detailed explanation of a number of embodiments of the invention together with examples and references to the drawings. Obviously, the invention is in no way limited to the embodiment(s) described by way of nonlimiting illustration.

The subject of the invention is a container 1 for receiving and transporting a biopharmaceutical fluid 2 (said container 1 hereinafter being referred to as "container").

The container 1 comprises a wall 3 delimiting an internal cavity 4. The internal cavity 4 of the container 1 is suited and intended to receive biopharmaceutical fluid 2. The qualifiers "internal" or "inner", and "external" or "outer" when applied to the container 1 reflect the fact that the container 1 delimits the internal cavity 4 in which the biopharmaceutical fluid 2 is placed. It is therefore with reference to this situation that these qualifiers should be understood. The container 1 may take any form, notably cylindrical, parallelepipedal or other so as to form the internal cavity 4. The container 1 may notably be in the form of a tank. In particular, the wall 3 comprises a bottom wall 3a and a lateral peripheral wall 3c. In the embodiment where the container 1 has a parallelepipedal form, the lateral peripheral wall 3c may be erected in four panels, two-by-two, at right angles or parallel to one another.

Figure 3:
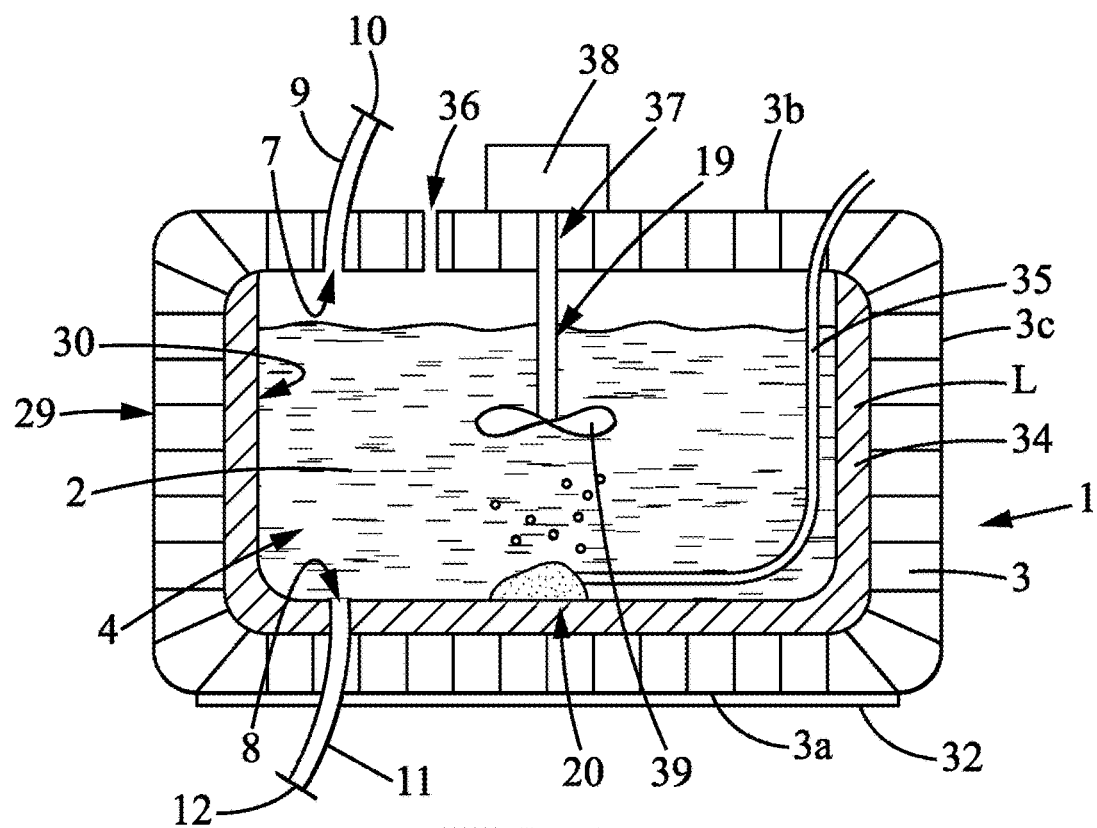
FIG. 3 is a schematic view of a container in the inflated state according to another embodiment.
Figure 4:
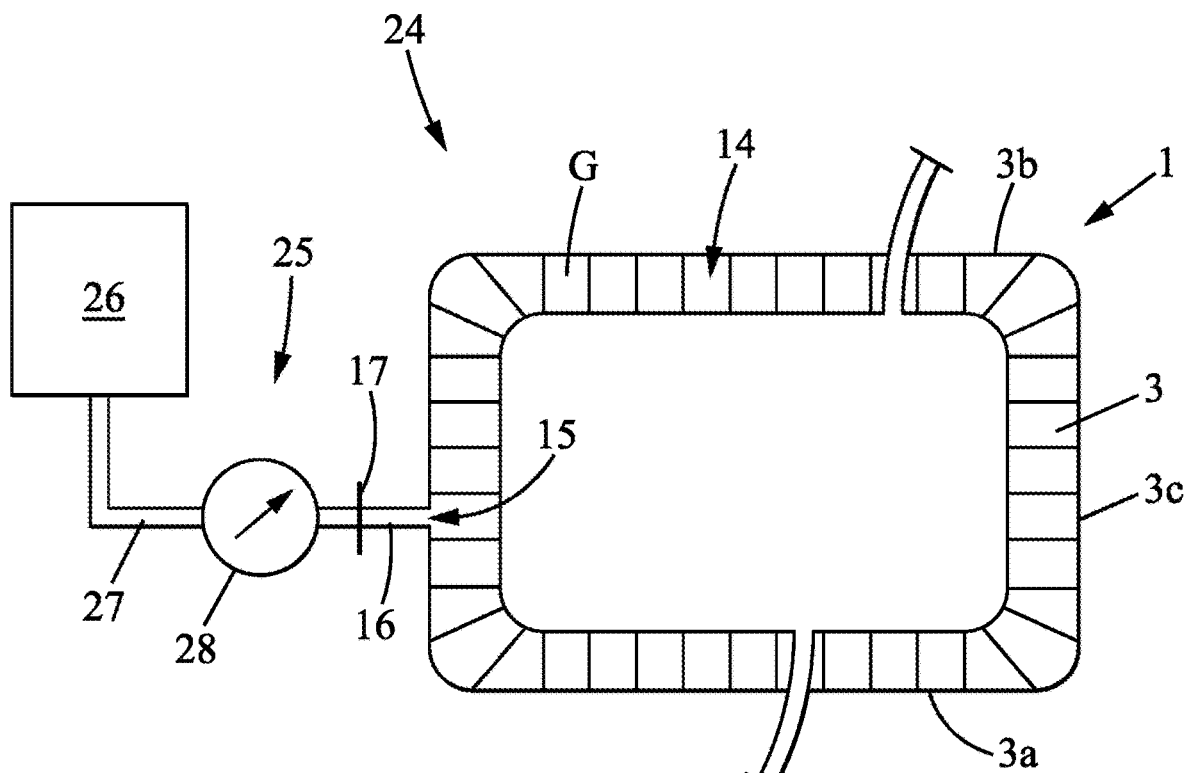
FIG. 4 is a schematic view of a system for receiving and transporting a biopharmaceutical fluid under controlled pressure, the system comprising a container and a device for inflating the container.

The wall may also comprise a top wall 3b. In a normal situation as represented in FIGS. 1A, 3 and 4 in the inflated state, the bottom wall 3a and, if appropriate, the top wall 3b, are arranged horizontally or substantially horizontally while the lateral peripheral wall 3c is arranged vertically or substantially vertically, possibly slightly flared from the bottom wall 3a. The description is given in relation to this situation. It is also with reference to this situation that the words "horizontal", "vertical", "bottom", "top" should be understood.

The wall 3 comprises in particular an outer portion 29 and an inner portion 30 (the terms "inner" and "outer" having to be understood as explained previously). Thus, the inner portion 30 delimits more particularly the internal cavity 4 of the container 1.

The outer 29 and inner 30 portions of the wall 3 may preferably be made from an advantageously flexible material. According to one embodiment, the wall 3, notably the outer portion 29 and/or the inner portion 30, may comprise a number of layers superposed one on top of the other. Such superposed layers make it possible to obtain a good resistance of the wall 3, notably to impacts during transport operations. Thus, according to the embodiment represented in FIG. 5, the outer portion 29 of the wall 3 comprises four layers 31a, 31b, 31c, and 31d of plastic material, for example made of polyvinyl chloride (PVC). However, this embodiment is not limiting, the outer portion 29 and/or the inner portion 30 being able to comprise two layers, three layers or more than four layers superposed one on top of the other.

Figure 5:
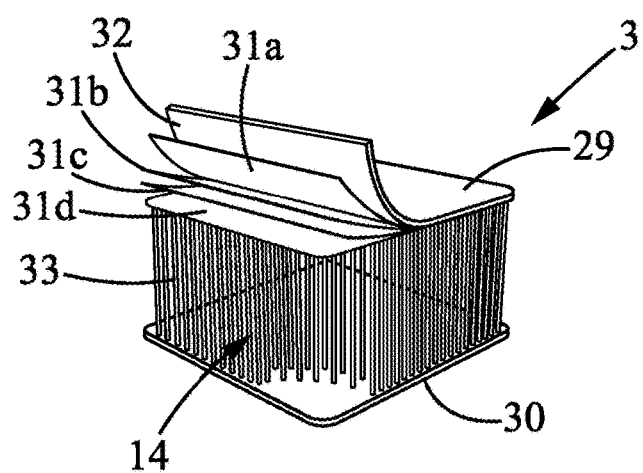
FIG. 5 is an enlarged view of the wall of the container of FIG. 1.

As represented also in FIG. 5, the outer portion 29 may also comprise an external non-slip coating 32, for example made of ethylene vinyl acetate (EVA). The non-slip coating 32 notably partially or completely covers the outer portion 29 of the bottom wall 3a. Such a coating 32 makes it possible to ensure that the container 1 is held well and has good stability, notably during the transportation thereof.

The outer portion 29 and the inner portion 30 delimit between them an intermediate space 14.

The wall 3 may comprise a plurality of filaments 33 extending, advantageously rectilinearly, between the outer portion 29 and the inner portion 30 in the intermediate space 14. The filaments 33 are for example linked to or produced as part of the outer portion 29 and/or the inner portion 30. The filaments 33 extend more particularly transversely to the outer 29 and inner 30 portions. The filaments 33 may be made of an advantageously rigid plastic material, for example polyester. Such filaments 33 make it possible to stabilize and rigidify the wall 3 of the container 1, notably when the latter is in the inflated state as will be described hereinbelow.

According to one embodiment, the wall 3 of the container 1 may be at least partly transparent or translucent so as to view through the internal cavity 4 and the biopharmaceutical fluid 2. Moreover, the wall 3 of the container 1 may also be at least partly, even totally, opaque to light or to ultraviolet rays, for example to ensure optimal conservation of the biopharmaceutical fluid 2, notably if the biopharmaceutical fluid 2 is a photosensitive product.

According to a first exemplary embodiment as represented for example in FIG. 1, 3 or 4, the internal cavity 4 delimited by the wall 3 of the container 1 is a closed space. "Closed" should be understood to mean that the container 1 does not comprise any macroscopic opening making it possible for an operator to directly access the internal cavity 4 that it delimits. In particular, the container 1 then comprises a top wall 3b completely closing the internal cavity 4. The bottom wall 3a, the top wall 3b and the lateral peripheral wall 3c are then secured to one another so as to form a container 1 of a single piece. The internal cavity 4 may consequently be sterile, that is to say free of any external contamination.

However, although delimiting a closed internal cavity 3, the container 1 is provided with at least one filling orifice 7, that is to say a passage for biopharmaceutical fluid 2, and at least one draining orifice 8, that is to say a passage for the biopharmaceutical fluid 2. The filling orifice 7 is more particularly situated in the top wall 3b. The draining orifice 8 is more particularly situated in the bottom wall 3a or in the bottom part of the lateral peripheral wall 3c.

A filling tube 9, having, at the opposite end, an inlet 10 for filling the internal cavity 4 with the biopharmaceutical fluid 2, is associated by a leak-tight link with the filling orifice 7 of the container 1. A draining tube 11, having, at the opposite end, an outlet 12 for emptying the internal chamber 4 of the biopharmaceutical fluid 2, is associated with the draining orifice 8 of the container 1.

"Seal-tight link" should be understood to mean a structure that is already known such that the wall 3 of the container 1 and the tube 9, 11 fluidically connected with the orifice 7, 8, are associated with one another in such a way as to both not allow any passage at the link between them, notably for the biopharmaceutical fluid 2 or a gas or possible contaminants. The wall 3 of the container 1 and the tubes 9, 11 may notably form an indissociable secure whole or be linked together by coupling systems.

"Tube" should be understood to mean a hollow structure of greater or lesser length or shortness, the term also including a simple port.

As a variant, the container 1 may comprise a single filling and draining orifice. According to this variant, a single tube serving as tube for filling and tube for emptying the chamber of biopharmaceutical fluid 6 is then associated by a leak-tight link to an orifice of the container 1. According to yet another variant, the container 1 may comprise more than two filling and draining orifices, and therefore more than two filling and/or draining tubes.

Figure 2:
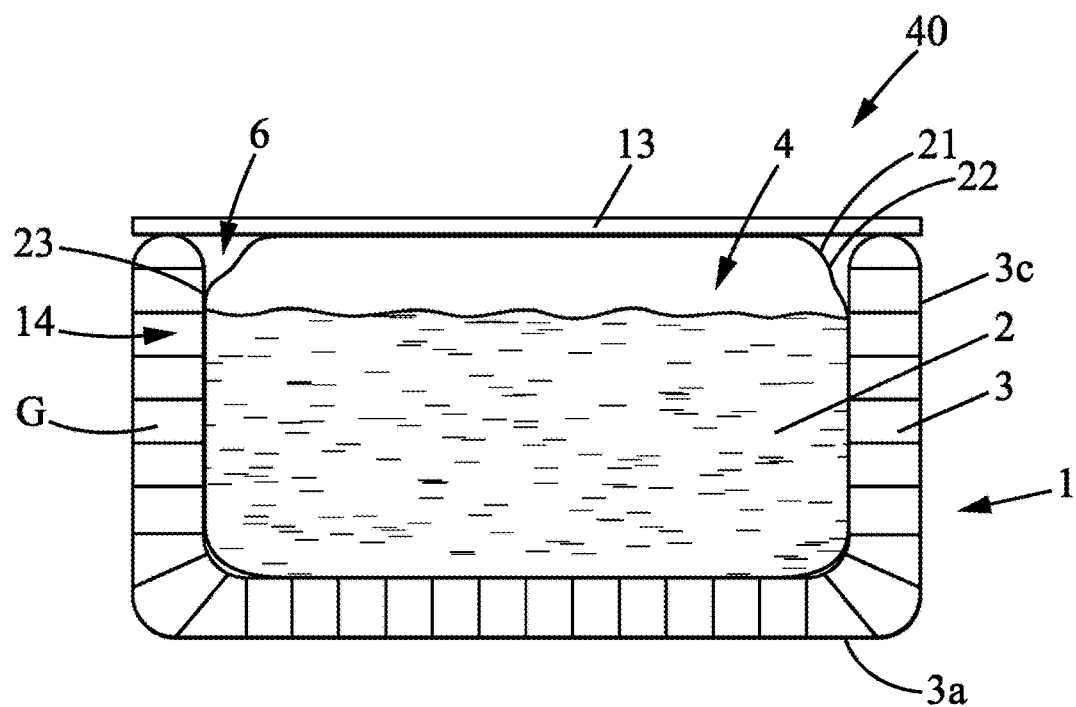
FIG. 2 is a schematic view of a container in the inflated state according to a second exemplary embodiment, the top wall of the container being open and an internal pouch being arranged in the internal cavity of the container to contain the biopharmaceutical fluid.

According to a second exemplary embodiment as represented for example in FIG. 2, the wall 3 may comprise an opening 6 making it possible to directly access the internal cavity 4 of the container 1. In particular, the top wall 3b may be partially or completely open. According to this second exemplary embodiment, a containing plate 13 may be used to alternately close or open the opening 6 of the container 1. The containing plate 13 may be provided with gripping and handling members. If appropriate, elements are provided for rapidly locking the containing plate 13 in order to block the opening 6.

According to this second embodiment in which the container 1 comprises an opening 6, the latter may also comprise a filling orifice 7 and/or a draining orifice 8 (not represented in FIG. 2) as described previously.

According to the invention, the container 1 is inflatable. The container 1 is in particular suited and intended to be inflated under pressure by an inflation gas G, in particular by air or by an inert gas. Thus, the container 1 may alternately be in a non-inflated state or in an inflated state.

Figure 1B:
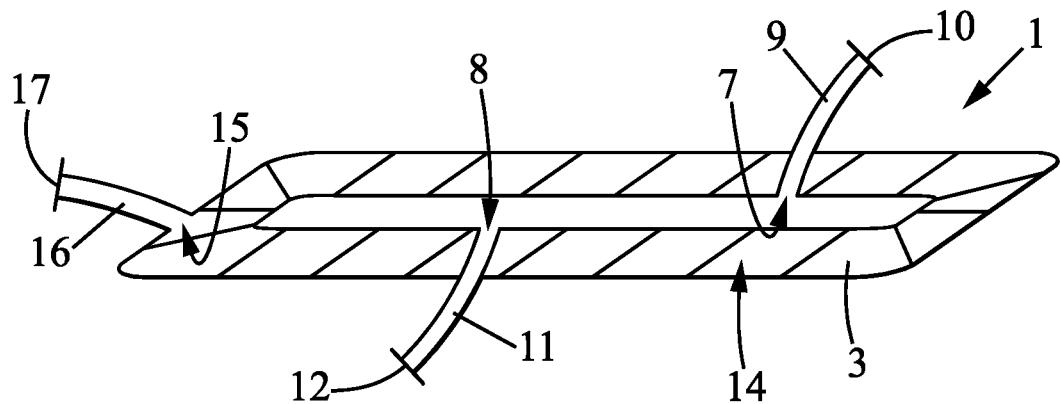
FIG. 1B is a schematic view of the container of FIG. 1A in the non-inflated state.

In the non-inflated state, the container 1 is flat, that is to say empty of pressurized inflation gas G. In this non-inflated state, the container 1 occupies a minimal space as represented in FIG. 1B, and may for example be folded.

In the inflated state, the container 1 is deployed in volume as represented notably in FIG. 1A. The container 1 then delimits the internal cavity 4 in order to contain the biopharmaceutical fluid 2. The peripheral lateral wall 3c then has, for example, a height H less than 1 metre, even equal to 70 centimetres. The bottom wall 3a then has a bottom surface area of less than 1 square metre, even equal to 0.83 square metre. Thus, the internal cavity 4 has sufficient volume to contain the biopharmaceutical fluid 2.

In the inflated state, the container 1, notably the peripheral lateral wall 3c, is rigid or semi-rigid. "Rigid or semi-rigid" should be understood to mean that the container 1, notably the peripheral lateral wall 3c, is inflated by the pressurized gas G so as to have at least sufficient rigidity in order to support itself to contain the biopharmaceutical fluid 2. Furthermore, the container 1 has, in the inflated state, a peripheral lateral wall 3c that is solid enough to protect the biopharmaceutical fluid 2 with which the internal cavity 4 is filled.

While being rigid enough, the wall 3 of the container 1 in the inflated state retains an elastic nature making it possible to ensure a damping function, for example in the event of impacts or turbulences during the operations of transporting the container 1. Conversely, the containers that are already known, and notably those made of stainless steel that are traditionally used, do not allow for such damping.

The capacity for deformation of the inflatable container 1 between the non-inflated state and the inflated state stems firstly from the configuration of the container 1, typically so as to pass from an empty configuration to a volume configuration by virtue of the pressurized inflation gas G. This capacity for deformation may stem, secondly, from an intrinsic capacity for deformation of the wall 3 of the container 1, notably of the outer 29 and/or inner 30 portions, by virtue of the fact that they may exhibit a certain capacity for extension, notably elastic.

In order to fill the container 1 with inflation gas G, the intermediate space 14 of the wall 3 forms and delimits a leak-tight inflation chamber. As represented for example in FIG. 1, the wall 3 is provided with an injection orifice 15, that is to say a passage for injection of inflation gas G fluidically connected with the inflation chamber.

An injection tube 16 is associated with the injection orifice 15 of the wall 3, by a leak-tight link having, at the opposite end, an injection orifice inlet 17 for injection of inflation gas G into the inflation chamber. Once the container 1, notably the wall 3, is inflated by the inflation gas G, the injection orifice inlet 17 or the injection tube 16 may be sealed, notably irreversibly, for example by welding.

"Leak-tight link" should be understood here to mean a structure that is already known such that the wall 3 of the container 1 and the injection tube 16, fluidically connected with the injection orifice 15, are associated with one another, so as to both not allow any passage at the link between them for outside air or inflation gas G.

In the inflated state, the container 1 has a capacity of between 100 litres and 1000 litres, in particular between 200 and 500 litres, and it depends on the requirements and the applications.

The wall 3 may be adapted to come directly into contact with the biopharmaceutical fluid 2. Thus, the inner portion 30 may be neutral to and/or biocompatible with the biopharmaceutical fluid 2 which fills the container 1. In other words, the quality of the biopharmaceutical fluid 2 is not affected by its coming into contact with the inner portion 30 of the container 1. The inner portion 30 may, to this end, be covered with or formed by low-density polyethylene (LDPE).

However, as a variant, the container 1 may also comprise an internal pouch 21, adapted to be interposed between the inner portion 30 of the container 1 and the biopharmaceutical fluid 2. An internal pouch 21 may notably be used and arranged in the internal cavity 4 of the container 1 when the latter comprises an opening 6 according to the second exemplary embodiment as described previously and as represented in FIG. 2. Such an internal pouch 21 is for example described in the patent FR 2781202.

The internal pouch 21 may be flexible and leak-tight. The internal pouch 21 is formed from a closed wall 22, made of plastic material. "Leak-tight" should be understood here to mean that the wall 22 of the internal pouch 21 does not allow any passage of biopharmaceutical fluid 2, of gas, or of possible contaminants. The internal pouch 21 is placed entirely in, that is to say inside of, the internal cavity 4 of the container 1.

The internal pouch 21 preferably has a form complementing that of the internal cavity 4 of the container 1. For example, in the embodiment in which the container 1 has a parallelepipedal form, the internal pouch 21 also has a parallelepipedal form in order to be shaped to and inserted easily in the internal cavity 4. Furthermore, the internal pouch 21, once filled with biopharmaceutical fluid, shapes itself to the form of the internal cavity 4 because of the pressure exerted by the biopharmaceutical fluid 2 on its wall 22.

The wall 22 of the internal pouch 21 may be simply positioned in the internal cavity 4 or may be fixed to the wall 3 of the container 1, for example on a common edge or a common lateral surface 23.

The wall 22 of the internal pouch 21 may be fixed to the container 1 by any means. In particular, the internal pouch 21 may be fixed to the container 1 reversibly for example using self-gripping means. According to this variant, the internal pouch 21 may thus be detached from the container 1, for example once the container 1 has been emptied of the biopharmaceutical fluid 2. The internal pouch 21 may then be an element that is distinct and separate from the container 1.

The invention then also relates to a system 40 comprising a container 1 and an internal pouch 21 distinct from the container 1.

According to another variant, the internal pouch 21 may be fixed irreversibly, that is to say definitively, to the container 1. According to this variant, the internal pouch 21 may be fixed to the container 1 by gluing, by welding or by any other similar means.

The internal pouch 21 may be provided with an orifice, that is to say a passage for filling with the biopharmaceutical fluid 2 and an orifice, that is to say a passage for emptying the biopharmaceutical fluid 2.

A tube for filling the internal pouch 21 is associated with the filling orifice by leak-tight links having, at the opposite end, a filling inlet. A draining tube is associated with the draining orifice having, at the opposite end, a draining outlet.

As a variant, the internal pouch 21 may comprise a single orifice for filling and for draining. According to this variant, a single tube serving as tube for filling and tube for emptying the chamber of biopharmaceutical fluid 2 is then associated by a leak-tight link with the orifice of the internal pouch 21. According to yet another variant, the internal pouch 21 may comprise more than two filling and draining orifices, and therefore more than two filling and/or draining tubes.

Moreover, the filling tube and/or the draining tube may be formed in, respectively may pass through, the wall 3 of the container 1. As a variant, the filling tube and/or the draining tube may pass through the opening 6 of the container 1 if appropriate.

The internal pouch 21 is preferably at least partly, even totally, transparent or translucent so as to make it possible to view through, and in particular through the wall 22, the biopharmaceutical fluid 2. Moreover, the internal pouch 21 may also be at least partly, even totally, opaque to light or to ultraviolet rays for example to guarantee optimal conservation of the biopharmaceutical product 2, notably if the biopharmaceutical product 2 is a photosensitive product.

Preferably, the lateral peripheral wall 3c of the container 1 entirely surrounds the internal cavity 4. The lateral peripheral wall 3c of the container 1 is advantageously solid, that is to say without any holes or openings, that is to say also completely closed. The lateral peripheral wall 3c thus extends along the surface around the internal cavity 4.

Thus, the lateral peripheral wall 3c allows for a better protection of the biopharmaceutical fluid 2 and of the internal pouch 21 if appropriate. In effect, there is otherwise a risk, when the internal pouch 21 is filled with biopharmaceutical fluid 2, of the wall 22 of the internal pouch 21 being deformed at an opening of the lateral peripheral wall 3c, notably by virtue of the pressure of the biopharmaceutical fluid 2. This may have the consequence of creating an area of mechanical stress on the wall 22 that may ultimately lead to a degradation, even a tearing, of this wall 22 of the internal pouch 21.

According to one embodiment, the container 1 may also comprise heating and/or cooling means intended to heat and/or cool the biopharmaceutical fluid 2 of the container 1. According to this embodiment, the wall 3 of the container 1, notably the inner portion 30, may be made of a material exhibiting a certain thermal conductivity, for example greater than that of stainless steel which is approximately 16 $W^{-1} \cdot m^{-1} \cdot k^{-1}$ at 23 degrees Celsius, so as to improve the implementation of the heating and/or cooling means.

Moreover, the intermediate space 14 delimited by the wall 3 may comprise a heating and/or cooling means in the form of a chamber 34 adapted to contain a cooling and/or heating liquid L, as represented in FIG. 3. In this case, there may also be provided means for controlling the temperature of the biopharmaceutical fluid 2 in the container 1 and means for controlling the heating and/or cooling means. Such means for controlling the temperature are borne by one or more ports provided for this purpose. There may also be provided means adapted to allow for the circulation, as a pump, particularly in closed circuit, of the cooling and/or heating liquid L, from the chamber 34 to a device for heating/cooling the liquid L advantageously external to the container 1.

According to one embodiment, as represented for example in FIG. 3, the container 1 may comprise mixing means 19. The mixing means 19 may for example take the form of one or more shafts fixed to the wall 3 of the container 1, suitable for being rotationally driven by a motor 38 situated outside the container 1 and for rotationally driving at least one mixing member 39. A mixing member 39 may for example take the form of a propeller having a hub supporting a number of blades. According to this embodiment, the container comprises an opening 37 in order to connect the shaft 19 to the motor 38.

According to one embodiment, as represented for example in FIG. 3, the container 1 may also comprise aeration means 20 suitable for delivering to the content a certain quantity of aeration gas. These aeration means 20 thus make it possible to aerate the biopharmaceutical fluid 2 which is located in the internal cavity 4 of the container 1. The aeration means 20 may comprise means 35 for supplying aeration gas having at least one tubular element extending by fluidic connection from the outside of the container 2. The supply means 35 are advantageously fixed onto the inner portion 30 of the wall in order not to risk interaction or to be in contact with the mixing means 19 as appropriate.

With the aeration means 20 which have just been described, there may be associated at least one aeration gas discharge orifice 36 formed in the top part of the wall 3 of the container 1. Such an aeration gas discharge orifice 36 makes it possible to discharge from the container 2, to the outside, the gas which has not been mixed with the content of the container 2.

To the abovementioned means there may also be added sensors of pH, oxygen measurement, conductivity and/or biomass type, via a port passing through the wall 3 of the container 1 by leak-tight link. In the case of the use of an internal pouch 21 as previously described, at least one sensor passes through the wall 22 of the internal pouch 21 and is placed partially in the internal cavity 4 via such a port.

The invention relates also to a system 24 for inflating a container 1. The system 24 comprises the container 1 and a device 25 for inflating the container 1.

The inflation device 25 comprises a source 26 of pressurized inflation gas G and a line 27 for injecting pressurized inflation gas G, suitable for being associated by fluidic connection or associated by fluidic connection at the outlet with the injection orifice 15 for pressurized inflation gas G of the container 1.

The device 25 also comprises a monitoring and control element 28. The monitoring and control element 28 may for example be a controller of pressure of the pressurized inflation gas G in the injection line 27, so as to order the injection of inflation gas G when that is desired and order the injection with the desired pressure. Such an element 28 may be a pressure gauge, an adjustable valve and/or a control line between them.

The invention relates also to a method for receiving and transporting biopharmaceutical fluid 2.

There is initially a system 24 comprising the container 1 and the inflation device 25. The container 1 is then in the non-inflated state, empty of biopharmaceutical fluid 2.

The container 1, notably the inflation chamber, is inflated with the inflation device 25. In particular, the injection line 27 for pressurized inflation gas G is associated by fluidic connection with the injection orifice inlet 17 for pressurized inflation gas G of the container 1. The container 1 is then in the inflated state.

The container 1 may then be dissociated from the inflation device 25.

If appropriate, in particular according to the second exemplary embodiment described above in which the container 1 comprises an opening 6, the internal pouch 21 is introduced into the internal cavity 4 of the container 1.

Then, the internal cavity 4 of the container 1 is filled with biopharmaceutical fluid 2, notably via the filling inlet 10 of the container or the filling inlet of the internal pouch 21, then the filling inlet 10 is brought to the closed state, the draining outlet 12 being also in the closed state.

The container 1 may be loaded onto a ship, a truck, an aeroplane in order to transport the biopharmaceutical fluid 2.

Following the transport operations, the container 1 is emptied of the biopharmaceutical fluid 2 by bringing the draining outlet 12 to the open state. The container 1 may thus be emptied of all of the biopharmaceutical fluid 2.

Once the biopharmaceutical fluid 2 has been transferred, the internal pouch 21 may be taken out of the container 1 if appropriate. The internal pouch 21 may be disposed of, the latter being disposable.

The container 1 may also be disposable. The container 1 may then be disposed of after its use, notably after having been emptied of the biopharmaceutical fluid 2.

As a variant, the container 1 may be deflated and folded in order to be transported to the initial place of filling with biopharmaceutical fluid 2. The container 1 may then be reused for the future transportation of another biopharmaceutical fluid 2 with, if necessary, the installation of a new internal pouch 21 therein.

The method described above may be carried out partially, the steps described above being able to be carried out independently of one another.

Obviously, the invention is not limited to the embodiments described previously and given purely by way of example. It encompasses a wide range of modifications, alternative forms and other variants that a person skilled in the art will be able to envisage within the scope of the present invention and notably all combinations of the different modes of operation described previously, being able to be taken separately or together.

The invention claimed is:

1. A container and a biopharmaceutical fluid, the container comprising:
   a leak-tight wall having an outer portion and an inner portion, the outer portion and the inner portion delimiting between them an intermediate space being inflatable under pressure with an inflation gas, the intermediate space comprising a plurality of rigid plastic material filaments, each of the plurality of rigid plastic material filaments being spaced from each other and each of the plurality of rigid plastic material filaments extending between the outer portion and the inner portion,
   the container being adapted to be alternately in:
      a non-inflated state in which the container is empty of pressurized inflation gas,
      an inflated state in which the leak-tight wall of the container is inflated and delimits an internal cavity adapted to contain the biopharmaceutical fluid,
   the leak-tight wall comprising a peripheral lateral wall around the internal cavity, the peripheral lateral wall being completely rigid or semi-rigid when the container is in the inflated state so as be adapted to ensure a protection of the biopharmaceutical fluid,
   wherein the outer portion or the inner portion each comprise a plurality of layers of plastic material stuck together superposed one on top of the other,
   wherein the internal cavity of the container has a capacity of between 100 liters and 1000 liters, and
   wherein in the inflated state, the container is sufficiently rigid to support itself while containing the biopharmaceutical fluid during transport.

2. The container according to claim 1, in which the internal cavity is completely surrounded by the leak-tight wall so as to form a closed and sterile internal cavity.

3. The container according to claim 1, in which the inner portion is compatible with or neutral to the biopharmaceutical fluid, the biopharmaceutical fluid being directly in contact with the inner portion.

4. The container according to claim 1, comprising at least one injection orifice for inflation gas fluidically connected with the intermediate space, an injection tube being associated with the injection orifice by a leak-tight link and having an injection inlet opposite the injection orifice.

5. The container according to claim 1, wherein the internal cavity of the container has a capacity of between 200 liters and 500 liters.

6. The container according to claim 1, in which the container comprises a bottom wall linked to the lateral peripheral wall, the lateral peripheral wall being arranged vertically and transversely to the bottom wall such that the container in the inflated state is in the form of a tank.

7. The container of claim 1, wherein in the inflated state the leak-tight wall provides the container with an elastic nature that provides a damping function in an event of an impact or a turbulence during operations of transporting the container.

8. The container of claim 1, wherein each of the plurality of rigid plastic material filaments is comprised of a polyester.

9. The container according to claim 1, further comprising at least one injection orifice for inflation gas fluidically connected with the intermediate space, an injection tube being associated with the injection orifice by a leak-tight link and having an injection inlet opposite the injection orifice, wherein in the inflated state, the at least four layers of plastic material that comprise each of the outer portion and the inner portion remain superposed one on top of the other with adjacent interior surfaces in all of an area defined within a perimeter of the outer portion and a perimeter of the inner portion being stuck together.

* * * * *